(12) United States Patent
Peterson et al.

(10) Patent No.: US 7,536,775 B2
(45) Date of Patent: May 26, 2009

(54) METHOD FOR SAMPLE PREPARATION FOR EXPOSING A MAIN POLE OF A RECORDING HEAD

(75) Inventors: Phillip J. Peterson, Morgan Hill, CA (US); Monica L. Vargas, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 419 days.

(21) Appl. No.: 11/031,569

(22) Filed: Jan. 6, 2005

(65) Prior Publication Data
US 2006/0143900 A1    Jul. 6, 2006

(51) Int. Cl.
*G11B 5/127*    (2006.01)
*H04R 31/00*    (2006.01)

(52) U.S. Cl. .............. 29/603.16; 29/603.13; 29/603.14; 29/603.15; 29/603.18; 216/62; 216/65; 216/66; 360/121; 360/122; 360/317; 451/5; 451/41

(58) Field of Classification Search . 29/603.13–603.16, 29/603.18; 216/62, 66, 67; 360/122, 126, 360/317; 451/5, 41
See application file for complete search history.

(56) References Cited

U.S. PATENT DOCUMENTS

| | | | |
|---|---|---|---|
| 4,296,654 A * | 10/1981 | Mercer | 81/57.26 |
| 6,604,275 B1 * | 8/2003 | Mino et al. | 29/603.15 |
| 6,995,370 B2 * | 2/2006 | Fujita et al. | 250/310 |
| 6,998,188 B2 * | 2/2006 | Petillo | 429/34 |
| 2003/0129846 A1 * | 7/2003 | Liu et al. | 438/698 |
| 2004/0021980 A1 * | 2/2004 | Albrecht et al. | 360/97.02 |

* cited by examiner

*Primary Examiner*—Paul D Kim

(57) ABSTRACT

A method for sample preparation. The method includes mechanically polishing portions of an insulating layer over a main pole of a recording head embedded within a sample structure. The insulating layer is polished top down in planar layers perpendicular to an air bearing surface adjoining the main pole. The method also includes selectively wet etching the remaining portions of the insulating layer to expose the main pole, wherein the insulating layer surrounds the main pole. Etching is made without damaging the main pole.

16 Claims, 5 Drawing Sheets

METHOD FOR SAMPLE PREPARATION FOR EXPOSING A MAIN POLE OF A RECORDING HEAD

TECHNICAL FIELD

The various embodiments of the present invention relate to perpendicular recording head systems. More specifically, various embodiments of the present invention relate to sample preparation for exposing the main pole of the perpendicular recording head.

BACKGROUND ART

Sample preparation for operation and failure analysis is an important tool in providing a detailed inspection of the physical characteristics of a recording head fabricated on a substrate. With the structure of recording heads decreasing in size and becoming more complex, electron microscopy (e.g., scanning electron microscopy) has emerged as a critical tool for highly site-specific operation and failure analysis. More particularly, an important issue is the measurement of critical parameters on a main pole of the recording head. However, the difficulties associated with exposing the main pole of the recording head using conventional techniques make measurement of these critical dimensions inaccurate.

Physical characteristics of the main pole provide critical factors in determining the overall performance of the recording head. These physical characteristics are directly linked to the properties related to electrical and magnetic conductivity of the recording head. The most critical factors for the main pole properties include the flare point and flare angle.

Preparation of the sample structure for use in electron microscopy is necessary for examining the critical dimensions of the recording head. Conventional sample preparation techniques for the sample structure including the recording head include mechanical sectioning (e.g., mechanical lapping techniques). However, since the main pole target on the recording heads is at least one order of magnitude smaller than the thickness removed through any mechanical sectioning technique employed, it is very difficult to hit the main pole target. For instance, the mechanical lapping of the sample may remove too much of the insulator surrounding the main pole thereby damaging the main pole and rendering the sample useless for examination using electron microscopy. On the other hand, the mechanical lapping of the sample may not remove enough the insulator surrounding the main pole. In this case, the main pole has not been exposed enough for use in electron microscopy. As a result, the success rate for exposing the main pole sufficiently for use in electron microscopy is very low.

Another conventional technique used for sample preparation in electron microscopy is to combine the techniques of mechanical sectioning (e.g., mechanical lapping) with focused ion beam (FIB). For example, many FIB steps are used in conjunction with mechanical lapping to fine tune the exposure of the main pole of the recording head for examination in electron microscopy. However, this combined technique is very labor intensive and expensive, both in terms of human and equipment costs when used for failure analysis. As a result, the expense for sample preparation through a combined mechanical sectioning and FIB is cost prohibitive, especially if more than one sample in a batch of recording heads is to be examined. Additionally, because of the time and cost involved, the combined techniques of mechanical sectioning and FIB is not scalable to examine multiple recording heads in a batch of recording heads.

Thus, a need exists for a preparation technique that provides better main pole exposure for operation and failure analysis.

DISCLOSURE OF THE INVENTION

A method for sample preparation. The method includes mechanically polishing portions of an insulating layer over a main pole of a recording head embedded within a sample structure. The insulating layer is polished top down in planar layers perpendicular to an air bearing surface adjoining the main pole. The method also includes selectively wet etching the remaining portions of the insulating layer to expose the main pole, wherein the insulating layer surrounds the main pole. Etching is made without damaging the main pole.

BRIEF DESCRIPTION OF THE DRAWINGS

The above and other objects and advantages of the present invention will be more readily appreciated from the following detailed description when read in conjunction with the accompanying drawings not drawn to scale, wherein.

BEST MODES FOR CARRYING OUT THE INVENTION

Reference will now be made in detail to embodiments of the present invention, a method and system for sample preparation for exposing a main pole of a recording head, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Accordingly, embodiments of the present invention provide a method and system for sample preparation for exposing a main pole of a recording head. As a result, other embodiments of the present invention serve the above purpose and provide a preparation technique that provides a high rate of success to expose the main pole or a recording for operation and failure analysis. Furthermore, other embodiments of the present invention serve the above purposes and provide a sample preparation technique that is allows for sample preparation in batches with a high rate of success. Still other embodiments of the present invention serve the above purposes and provide for sample preparation technique that is cost effective to employ during operation and failure analysis.

Embodiments of the present invention are described within the context of recording heads used for magnetic storage. That is, embodiments of the present invention can be used to expose recording heads of any type. However, in particular, embodiments of the present invention are described within the context of perpendicular recording heads used for magnetic storage. Perpendicular recording heads used for perpendicular recording magnetize the storage medium perpendicularly to the film plane, rather than in the file plane, as in horizontal recording. As such, embodiments of the present invention are described within the context of exposing the main pole of a perpendicular recording head sued for magnetic storage.

Figure 1A:
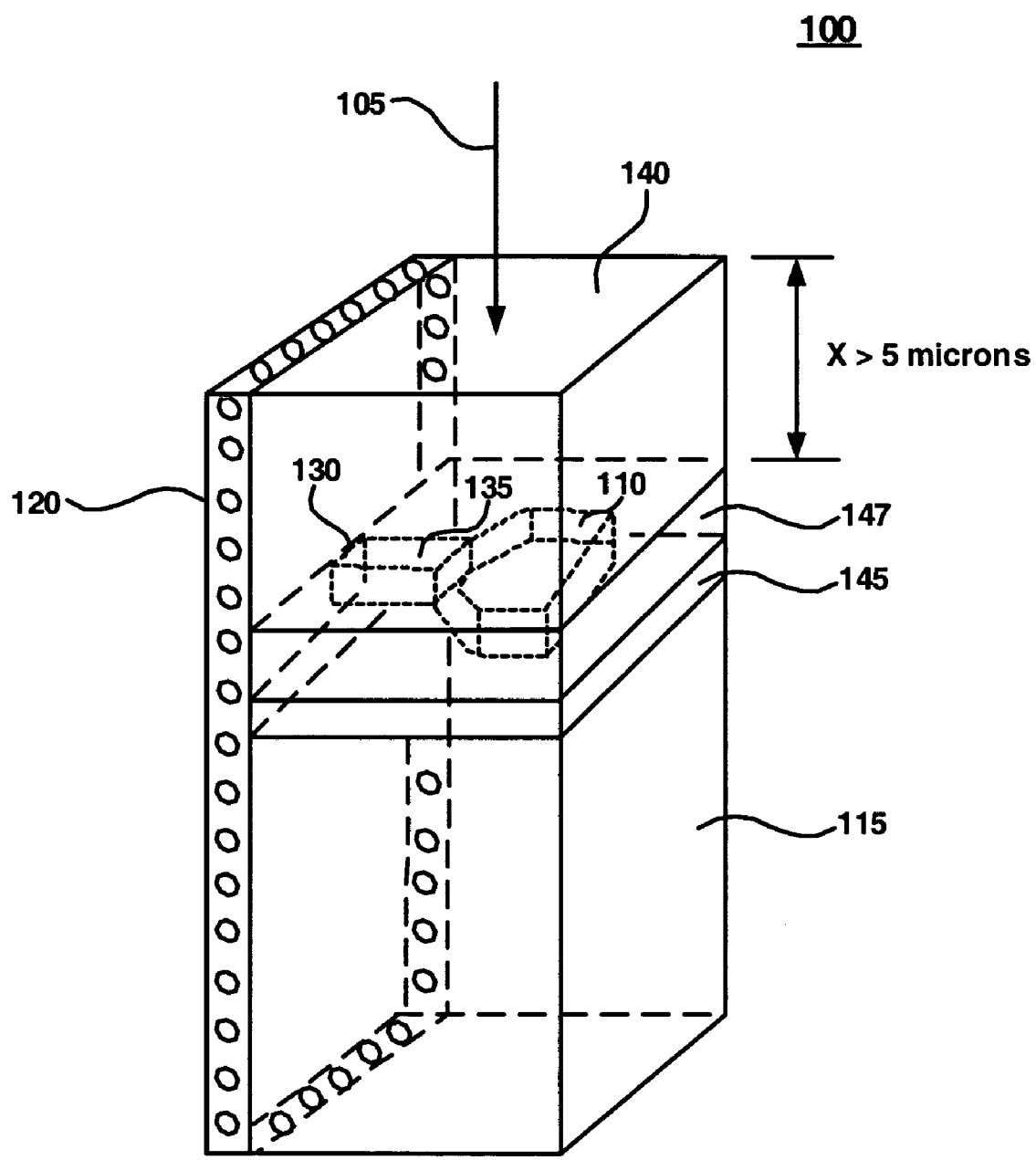
FIG. 1A is a diagram illustrating a perspective view of a sample structure including a recording head, in accordance with one embodiment of the present invention.

FIG. 1A is a diagram illustrating a perspective view of a sample structure 100 including a main pole of a recording head, in accordance with one embodiment of the present invention. Sample preparation of the structure 100 is necessary to expose the deposited end of the recording head 110 for examination in electron microscopy (e.g., scanning electron microscopy [SEM]). The features in FIG. 1A are not drawn to scale.

While embodiments of the present invention are described within the context of perpendicular recording (e.g., write) heads, other embodiments of the present invention are well suited for exposing any type of recording head, component, or detail of a semiconductor integrated circuit.

As shown in FIG. 1A, the deposited end of the recording head 110 is embedded within the sample structure 100. Also shown is a substrate 115 upon which the deposited end of the recording head 110 is deposited. The deposited end of the recording head 110 is deposited on an upper surface of the substrate 115.

An insulating layer surrounds the deposited end of the recording head 110. In one embodiment, the insulating layer is comprised of alumina ($Al_2O_3$). As shown in FIG. 1A, the insulating layer includes an insulating undercoat 145 and an insulating overcoat 140. The insulating layer also includes a middle coat 147 of alumina shown in FIG. 1A within which the deposited end of the recording head 110 is formed As such, the deposited end of the recording head 110 is shown embedded between the insulating overcoat 140 and the insulating undercoat 145 within the middle layer 147. That is, the deposited end of the recording head 110 is surrounded by the insulating layer. In one embodiment, the insulating layer provides support for the deposited end of the recording head 110 in the sample structure 100.

In addition, a carbon overcoat layer 120 is shown in FIG. 1A. The carbon overcoat layer 120 is formed on a side surface of the sample structure 100 that includes a side surface of the substrate 115 and a side surface of the insulating overcoat and undercoat layers 140 and 145. The main pole 135 of the deposited end of the recording head is exposed to the carbon overcoat layer 120 through the insulating overcoat 140, middle coat 147, and undercoat 145. In particular, the carbon overcoat layer 120 provides further protection for the exposed tip of the main pole 135 of the deposited end of the recording head 110. That is, the carbon overcoat layer 120 protects the pole tip from corrosion.

In addition, an air bearing surface 130 is shown in FIG. 1A. The air bearing surface 130 is adjacent to the exposed tip of the main pole 135 of the deposited end of the recording head 110. The air bearing surface 130 interfaces with a storage medium (not shown). For example, the air bearing surface 130 lies flat or parallel to the surface of the storage medium as data is being recorded or read from the storage medium.

As shown in FIG. 1A, the distance "x" measured from the deposited end of the recording head 110 to the top surface of the sample structure 100 is greater than 5 microns. Arrow 105 points to the top surface of the alumina overcoat 140. In addition, the arrow 105 points in the direction of a top down view of the sample structure 100 and the deposited end of the recording head 110.

The sample structure as shown in FIG. 1A is in an unprepared state. The alumina overcoat 140 in its present state impedes any view of the deposited end of the recording head 110 using SEM. That is, the dimensions of the insulating layer 140 are too great to allow SEM to examine the recording head 110.

Figure 2:
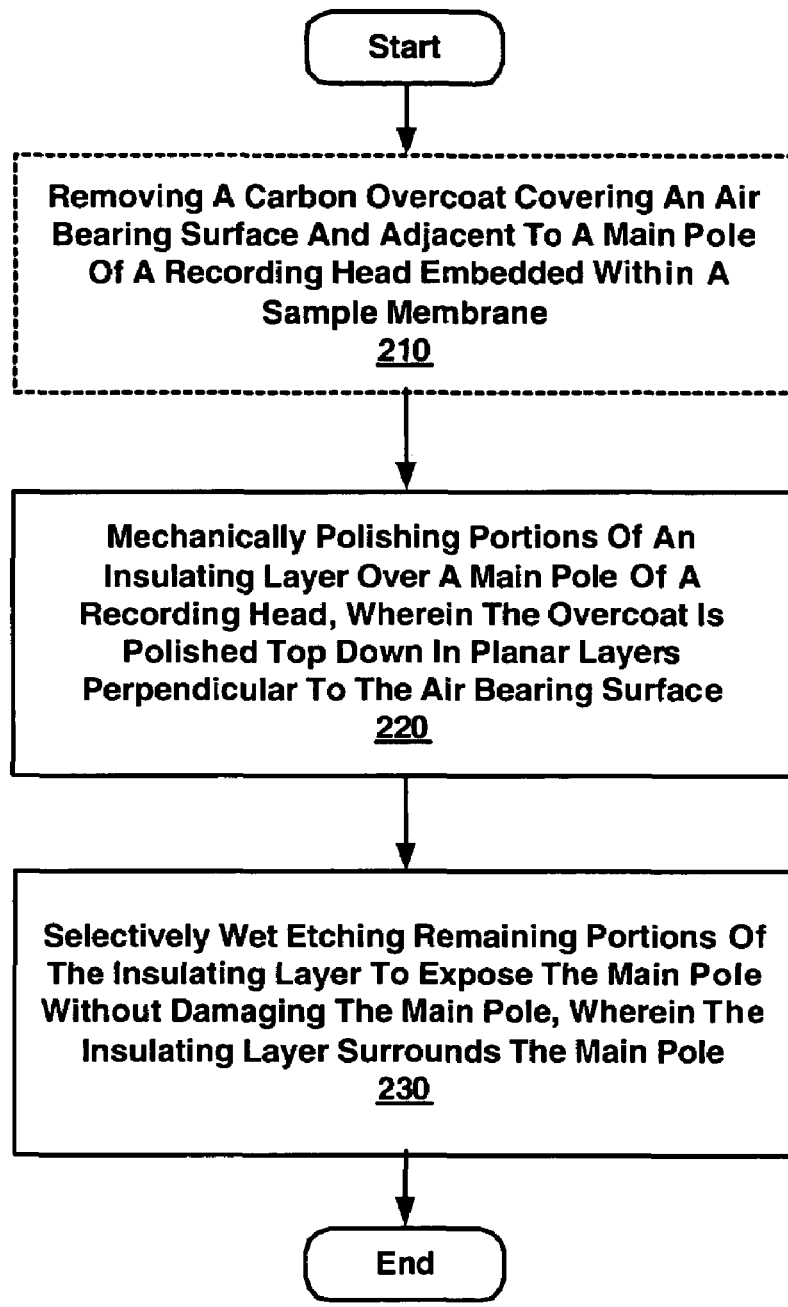
FIG. 2 is a flow diagram illustrating steps in a method for sample preparation for exposing a main pole of a recording head, in accordance with one embodiment of the present invention.

FIG. 2 is a flow diagram 200 illustrating steps in a method for sample preparation for exposing a main pole of a perpendicular recording head, in accordance with one embodiment of the present invention. While embodiments of the present invention are described within the context of perpendicular recording heads, other embodiments of the present invention are well suited to sample preparation for exposure of any type of recording head, or component of an semiconductor integrated circuit. One of the advantages of using the method as described in flow diagram 200 to expose the main pole is that there is a great increase in the success rate over conventional sample preparation techniques. Since the submicron target is not immediately exposed using mechanical sectioning, there is less of a chance to damage the recording head using the technique outlined in flow diagram 200.

At 210, the present embodiment optionally removes the carbon overcoat that covers an air bearing surface. The carbon overcoat is adjacent to the main pole of a perpendicular recording head. The recording head is embedded within a sample structure. Removal of the carbon overcoat is not necessary, but does provide improved measurements of the critical parameters as measured using electron microscopy (e.g., SEM). In one embodiment, the process used to remove the carbon overcoat includes an ash process. In particular, a dry strip process using oxygen plasma is used to strip the carbon overcoat layer. For instance, an oxygen ash process is applied for approximately 30 minutes to remove the carbon overcoat layer, in one embodiment.

At 220, the present embodiment mechanically polishes portions of an insulating layer (e.g., alumina) over a main pole of the recording head that is embedded within the sample structure. In particular, the present embodiment removes most of the insulating layer that is present above the main pole of the recording head. In one embodiment, the mechanical polishing is performed through a mechanical lapping process that grinds the surface of the sample structure. The sample structure is polished top down in planar layers perpendicular to an air bearing surface adjoining the main pole The mechanical polishing is performed to prepare the sample structure for the etching procedure that follows. More specifically, the mechanical polishing is performed to reduce the amount of alumina in the insulating layer that needs to be etched. Not only does this reduce the time for etching, but the mechanical polishing leaves the sample structure in a more uniform state for etching. That is, the surfaces of the insulating layer are more uniformly distant from the recording head, which provides for a more even etching of the insulating layer in relation to the recording head so that the recording head is not prematurely detached from the insulating layer.

In addition, removing most of the insulting layer through mechanical polishing also reduces the amount of debris around the target area of interest, the tip of the main pole of the recording head. Also, to further remove debris, another embodiment includes rinsing the sample structure after the mechanical polishing to further prepare the sample structure for the etching procedure that follows.

Figure 1B:
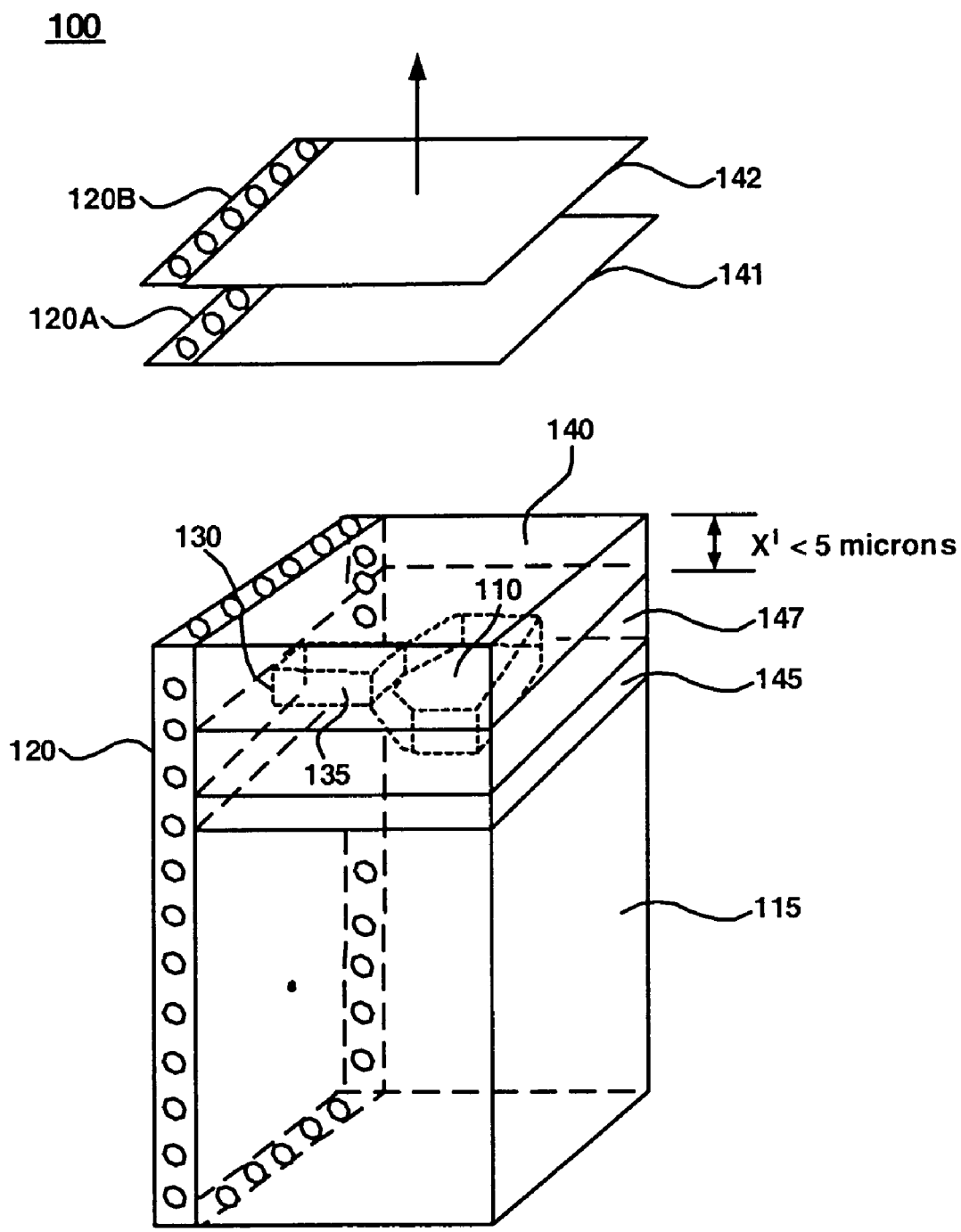
FIG. 1B is a is a diagram illustrating a perspective view of the sample structure of FIG. 1A after layers of an overcoat has been removed through mechanical polishing, in accordance with one embodiment of the present invention.

FIG. 1B is a diagram illustrating a perspective view of the sample structure 100 of FIG. 1A showing the process of mechanical polishing, in accordance with one embodiment of the present invention. As shown in FIG. 1B, the recording head 110 is surrounded by the insulating layer, to include the overcoat 140, the middle layer 147, and the undercoat 145. Also, the carbon overcoat layer 120 is shown covering the exposed tip of the main pole 135 of the deposited end of the recording head 110. As described before, in FIG. 1B, the carbon overcoat layer 120 has not been removed prior to the mechanical polishing. However, other embodiments of the present invention are well suited to performing a removal of the carbon overcoat layer 120, in which case, the carbon overcoat layer 120 would not be shown in FIG. 1B. The features in FIG. 1B are not drawn to scale.

As shown in FIG. 1B, the sample structure 100 is polished top down in planar layers perpendicular to the air bearing surface 130 adjoining the main pole 135. As shown in FIG. 1B, the planar layers 141 and 142, for example, are removed from the top down. The top down direction was previously described in relation to arrow 105 of FIG. 1A. More particularly, the planar layers of the insulating layer that are removed (e.g., layers 142 and 141) are parallel to a planar surface of the main pole upon which critical parameters can be measured.

As shown in FIG. 1B, planar layers 141 and 142 also include portions 120A and 120B, respectively, of the carbon overcoat layer 120. That is, if the carbon overcoat layer 120 has not been previously removed, the mechanical polishing will also remove portions of the carbon overcoat layer 120.

After removal of the planar layers, most of the alumina overcoat 140 is removed. As shown in FIG. 1B, the distance "x prime" measured from the deposited end of the recording head 110 to the top surface of the sample structure 100 is less than 5 microns. Embodiments of the present invention are able to mechanically polish the insulation overcoat to within less than one micron; however, the benefit of embodiments of the present invention is that by first mechanically polishing the insulating overcoat the general area surrounding the deposited end of the recording head is quickly exposed without damaging the main pole 135 of the deposited end of the recording head 110.

Returning now to flow diagram 200, at 230, the present embodiment selectively wet etches remaining portions of the insulating layer to expose the main pole. The insulating layer surrounds and supports the deposited end of the recording head. For instance, the etch is an isotropic etch that removes the insulating layer from all exposed surfaces.

Embodiments of the present invention use an etchant for the etching process that is an alkaline etching solution. For example solutions of sodium carbonate ($Na_2CO_3$) or sodium borate ($Na_2B_4O_7$), or any other similar solution in varying molar concentrations can be used as an etchant.

The selective wet etch is performed without damaging the main pole. That is, the selective wet etch can be performed without physically altering the characteristics of the main pole, and without dislodging the main pole and the deposited end of the recording head from the insulating layer. More specifically, the molar composition of the etchant used, the temperature (e.g., approximately 50 degrees Celsius) of the etching solution, and the duration of time for etching can be varied to control the rate and an amount of the insulating layer that is etched so that the main pole is not damaged.

In another embodiment, the sample structure is rinsed with a wetting agent after the selective etching process. For instance, the wetting agent is water ($H_2O$), such as de-ionized water. The rinsing is performed to remove the water soluble etch by-products so that the by-products will not crystallize and impede or block views of the main pole of the recording head.

The process outlined in flow diagram 200 allows for batching various sample structures of recording heads to be prepared simultaneously. As a result, the main pole physical parameters are revealed for SEM imaging without undergoing a laborious focused ion beam process.

After the process outlined in flow diagram 200 is completed, the main pole of the deposited end of the recording head is sufficiently exposed for viewing using an SEM. As such, the present embodiment further mounts the sample structure for SEM imaging. In another embodiment, the sample structure can be optionally flashed with a conductive coating (e.g., gold palladium [AuPd], carbon, chrome, gold [Au], platinum [Pt], etc.) to increase the electrical stability of the sample structure during the SEM imaging to measure critical parameters, such as flare point and flare angle of finished perpendicular recording heads. Flare point and flare angle provide information as to the performance of the recording head.

Figure 3:
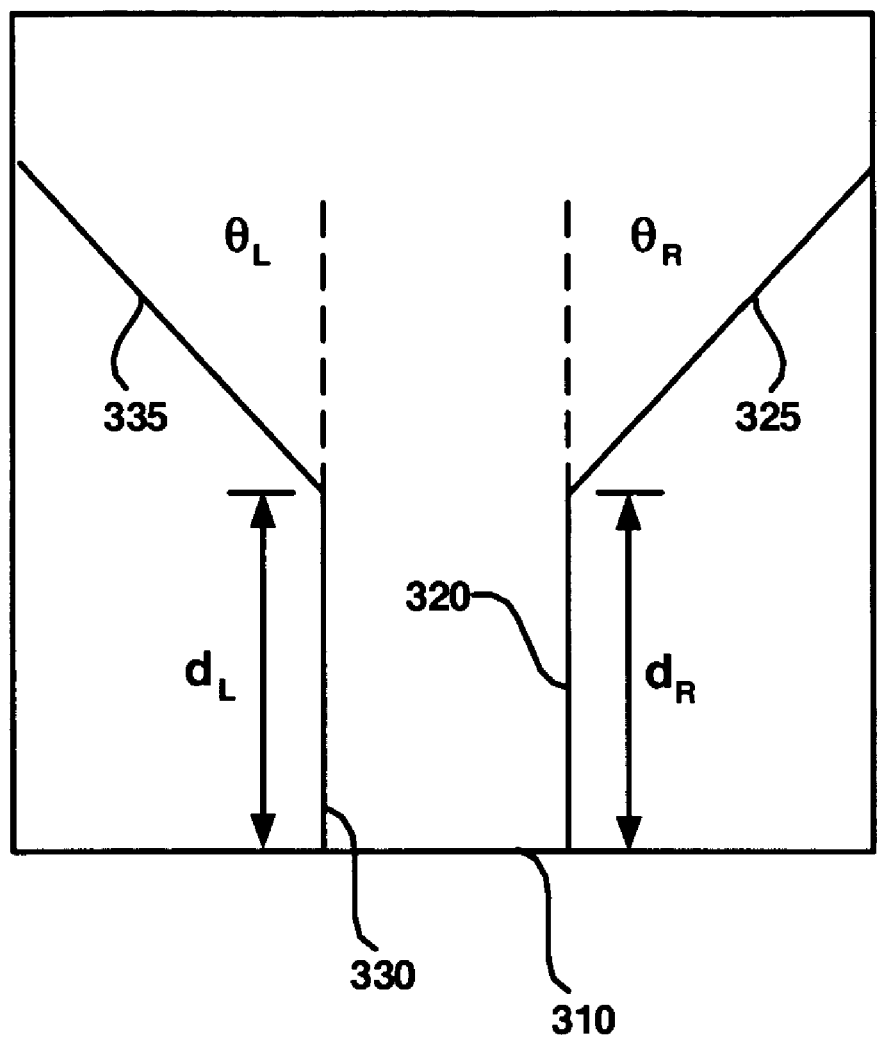
FIG. 3 is a top down view of the target area of the sample structure of FIG. 1A illustrating critical parameters of the main pole of a recording head, in accordance with one embodiment of the present invention.

FIG. 3 is a diagram of top down view of a planar surface of the main pole 300 of the deposited end of the recording head after exposure through a two step mechanical polish and etch process. As shown in FIG. 3, the main pole parameters can be imaged and measured using SEM. For instance, the distance of the flare point from tip of the main pole at the air bearing surface 310 to the flare point can be measured.

On the right side, the flare point is the intersection of the vertical portion 320 and the angled portion 325 of the main pole 300. On the right side, the distance to the flare point from the air bearing surface 310 is indicated by $d_R$. On the left side, the flare point is the intersection of the vertical portion 330 and the angled portion 335 of the main pole 300. On the left side, the distance to the flare point from the air bearing surface 310 is indicated by $d_L$. For example, the distances to the flare point from the air bearing surface 310 both on the left and right sides can be of dimensions less than 500 nanometers.

In addition, the flare angle can be measured. On the right side, the flare angle is measured as the angle between the vertical portion 320 that is extended and the angled portion 325. That is, the angle $\theta_R$ indicates the flare angle on the right side of the main pole 300. On the left side, the flare angle is measured as the angle between the vertical portion 330 that is extended and the angled portion 335. That is, the angle $\theta_L$ indicates the flare angle on the left side of the main pole 300.

Figure 4:
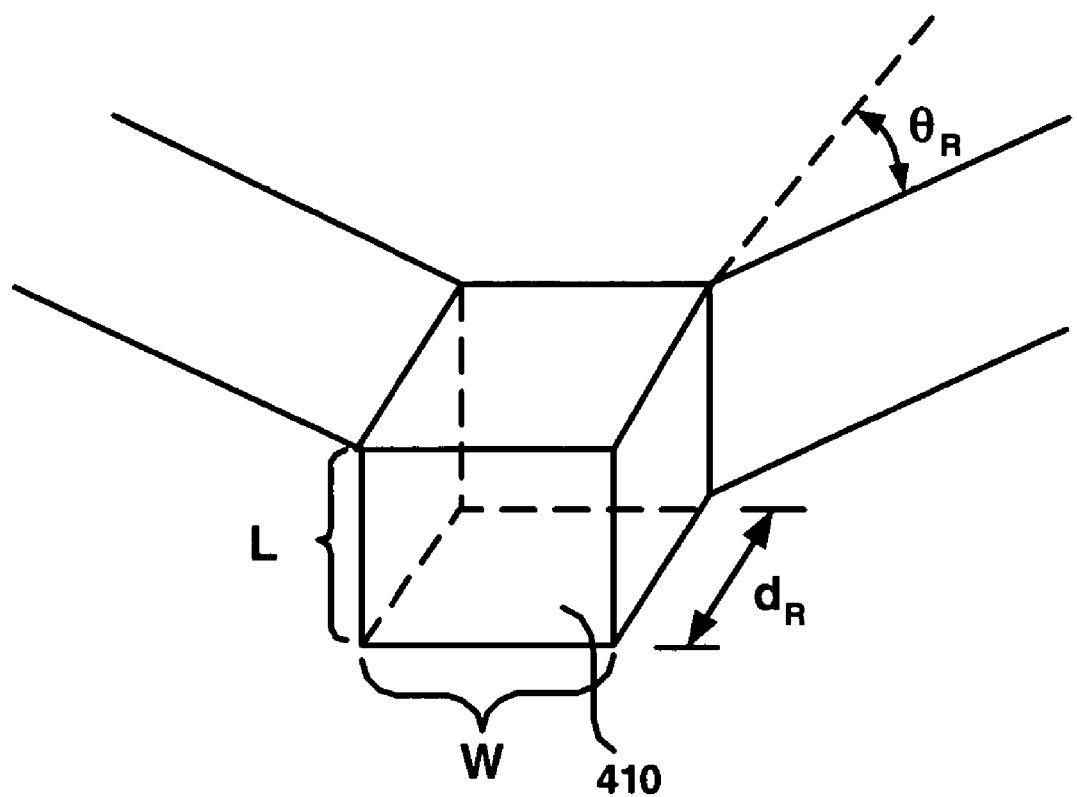
FIG. 4 is a diagram illustrating a perspective view of the tip of the main pole of a recording head, in accordance with one embodiment of the present invention.

FIG. 4 is an angled view of the main pole 300 of the deposited end of the recording head after exposure through a two step mechanical polish and etch process. As shown in FIG. 4, the main pole parameters can be imaged and measured using SEM. For instance, the length "L" and width "W" of the pole tip 410 adjacent to the air bearing surface can be measured. For example, the length "L" and width "W" can be of dimensions less than 200 nanometers. Also, as shown in FIG. 4 the distance "$d_R$" between the flare point and air bearing surface, as well as the flare angle "$\theta_R$" is provided. After the etching process, the main pole of the deposited end of the recording head can be fully exposed. That is, enough of the insulating layer has been etched away to expose the critical parameters of the main pole of the recording head; however, enough of the insulating layer remains to support and attach the main pole and the recording head to the substrate. With proper presentation of the sample structure, measurement of the length "L" and width "W" is possible using SEM imaging.

Accordingly, embodiments of the present invention provide a method and system for sample preparation for exposing a main pole of a recording head. Embodiments of the present invention are able to routinely measure the features of interest in a main pole of a recording head. That is, embodiments of the present invention can be performed in a manufacturing environment on a routine basis to allow physical confirmation of measurements of critical parameters concerning the main pole of the recording head.

A method and system for sample preparation for exposing a main pole of a recording head is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A method for sample preparation, comprising:
performing an oxygen ash process to remove a carbon overcoat adjoining a main pole of a recording head embedded within a sample structure;
mechanically polishing portions of an insulating layer over said main pole of said recording head embedded within said sample structure, wherein said insulating layer is polished top down in planar layers; and
selectively wet etching remaining portions of said insulating layer to expose said main pole without damaging said main pole, wherein said insulating layer surrounds said main pole.

2. The method of claim 1, wherein said recording head is a perpendicular recording head.

3. The method of claim 1, wherein said mechanically polishing comprises: mechanically lapping said planar layers.

4. The method of claim 1, wherein said selectively etching further comprises: etching said insulating layer in an alkaline etching solution.

5. The method of claim 1, wherein said insulating layer comprises alumina ($Al_2O_3$).

6. The method of claim 1, wherein said mechanically lapping comprises: lapping to within 5 microns or smaller of said main pole.

7. The method of claim 1, further comprising:
mounting said sample structure for SEM imaging.

8. The method of claim 1, wherein the planar layers are lapped perpendicular to an air bearing surface adjoining said main pole.

9. A method for sample preparation, comprising:
performing an oxygen ash process to remove a carbon overcoat adjoining a main pole of a perpendicular recording head embedded within a sample structure;
mechanically lapping portions of an alumina ($Al_2O_3$) insulating layer over said main pole, wherein said alumina insulating layer is lapped top down in planar layers perpendicular to an air bearing surface adjoining said main pole; and
selectively wet etching remaining portions of said alumina insulating layer to expose said main pole without damaging said main pole, wherein said alumina insulating layer surrounds said main pole.

10. The method of claim 9, wherein said mechanically lapping further comprises:
preparing said sample structure for said selective wet etching by rinsing said sample structure after said mechanically polishing.

11. The method of claim 9, wherein said mechanically lapping comprises:
lapping to within 5 microns or smaller of said main pole.

12. The method of claim 9, further comprising:
flashing said sample structure with a conductive coating.

13. The method of claim 9, further comprising:
rinsing said sample structure with a wetting agent after said selectively etching.

14. The method of claim 9, wherein said selectively wet etching further comprises:
varying time for said etching to control an amount of said alumina insulating layer that is etched.

15. The method of claim 9, wherein said selectively etching further comprises:
varying concentrations of an etchant used for said selectively etching to control an amount of said alumina insulating layer that is etched.

16. The method of claim 9, wherein said selectively etching further comprises:
varying temperature of a solution comprising an etchant used for said selectively etching to control an amount of said alumina insulating layer that is etched.

* * * * *